United States Patent
Koshy et al.

(10) Patent No.: US 10,581,724 B2
(45) Date of Patent: Mar. 3, 2020

(54) MANAGING NETWORK PACKET COMMUNICATION SIMULTANEOUSLY THROUGH WIRED AND WIRELESS NETWORK INTERFACES

(71) Applicant: Dell Products L.P., Round Rock, TX (US)

(72) Inventors: Kamal J. Koshy, Austin, TX (US); Benny J. Bologna, San Marcos, TX (US); Ricardo R. Velasco, Cumming, GA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/887,184

(22) Filed: Feb. 2, 2018

(65) Prior Publication Data

US 2019/0245777 A1  Aug. 8, 2019

(51) Int. Cl.
*H04L 12/709* (2013.01)
*H04W 52/26* (2009.01)
*H04L 12/931* (2013.01)
*H04L 12/935* (2013.01)

(52) U.S. Cl.
CPC ........ *H04L 45/245* (2013.01); *H04L 49/3009* (2013.01); *H04L 49/602* (2013.01); *H04W 52/267* (2013.01)

(58) Field of Classification Search
CPC ........ H04L 45/24; H04L 12/28; H04W 52/04; H04W 52/267; H04W 52/18
USPC .......................................... 370/392
See application file for complete search history.

(56) References Cited

U.S. PATENT DOCUMENTS

| | | | |
|---|---|---|---|
| 6,950,404 B2* | 9/2005 | Pearl | H04B 1/036 370/252 |
| 9,769,131 B1* | 9/2017 | Hartley | H04L 63/0428 |
| 2004/0258051 A1* | 12/2004 | Lee | H04L 12/4011 370/352 |
| 2006/0193295 A1* | 8/2006 | White | H04L 12/5692 370/336 |
| 2008/0130596 A1 | 6/2008 | Kalhan | |
| 2009/0046687 A1 | 2/2009 | Woo | |
| 2010/0138551 A1 | 6/2010 | Degaonkar | |
| 2012/0033672 A1 | 2/2012 | Page | |
| 2012/0254464 A1 | 10/2012 | Armstrong | |
| 2013/0100910 A1* | 4/2013 | Ali | H04L 1/0003 370/329 |
| 2013/0336317 A1 | 12/2013 | Mithyantha | |
| 2014/0370929 A1 | 12/2014 | Khawand | |
| 2015/0124821 A1 | 5/2015 | Chu | |

(Continued)

OTHER PUBLICATIONS

Kamal J. Koshy, U.S. Appl. No. 15/645,353, filed Jul. 10, 2017, entitled Multiple Link Aggregation Among Local Area Networks.

*Primary Examiner* — Jeffrey M Rutkowski
*Assistant Examiner* — Sudesh M Patidar
(74) *Attorney, Agent, or Firm* — Zagorin Cave LLP; Robert W. Holland

(57) ABSTRACT

A client information handling system application selectively communicates network packets simultaneously through plural network interfaces by leveraging network address translation at the network layer of the network packets. Network packets are distributed across the plural network interfaces to achieve desired network communication goals, such as bandwidth, data rates, quality of service, reliability and SAR requirements.

13 Claims, 10 Drawing Sheets

(56) References Cited

U.S. PATENT DOCUMENTS

| | | |
|---|---|---|
| 2015/0372872 A1 | 12/2015 | Bandyopadhyay |
| 2016/0174168 A1 | 6/2016 | Lu |
| 2017/0019370 A1 | 1/2017 | Ravinoothala |
| 2018/0131617 A1 | 5/2018 | Hira |
| 2018/0205652 A1 | 7/2018 | Saxena |

* cited by examiner

MANAGING NETWORK PACKET COMMUNICATION SIMULTANEOUSLY THROUGH WIRED AND WIRELESS NETWORK INTERFACES

CROSS REFERENCE TO RELATED APPLICATIONS

U.S. patent application Ser. No. 15/887,169, entitled "Information Handling System Network Communication with Through Link Aggregation" by Kamal J. Koshy and Sagar S. Samant, filed on same day herewith, which is incorporated by reference in its entirety as if fully set forth herein.

U.S. patent application Ser. No. 15/887,176, entitled "Information Handling System Network Communication with Through Link Aggregation" by Sinem Gulbay and Kamal J. Koshy, filed on same day herewith, which is incorporated by reference in its entirety as if fully set forth herein.

BACKGROUND OF THE INVENTION

Field of the Invention

The present invention relates in general to the field of information handling system communication, and more particularly to an information handling system network communication with a client through link aggregation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often communicate through networks to perform processing tasks. Generally, client information handling systems establish communication through a network to a server information handling system to retrieve and store information. Different types of networks support different types of communication at different data transfer rates. For example, a conventional client information handling system may communicate with a local area network (LAN) through a wired Ethernet communication, such as through a CAT 5 cable, through a USB or other serial cable, or through a variety of wireless communication protocols, such as a wireless local area network (WLAN) or a wireless wide area network (WWAN). In a typical enterprise or residential network, client information handling systems access networks through access points, such as with wireless or Ethernet interfaces. The access points allow multiple clients to interface through the access points and with external networks, such as through an Internet router interface.

Typically, applications executing on a client information handling system use a single network interface to communicate with external networks. For example, an Internet browser executing on a client information handling system establishes a network interface through a WLAN and uses the WLAN for communication with the network. Although other types of network interfaces are available, such as an Ethernet LAN interface or a WWAN interface, the application relies upon only one network interface to communicate with an external network. Some applications are available that support multiple network interfaces, such as Killer DoubleShot used in gaming. Network traffic is divided by application so that a selected application, such as a game that uses network communication, has all of the bandwidth of one network interface available, such as an Ethernet interface, while other applications share a separate network interface, such as a WLAN. Such applications effectively increase network bandwidth at a client information handling system by allowing simultaneous connections over multiple links. However, total available network bandwidth remains divided where each application has only one link through one network interface.

Although client information handling systems primarily rely upon access points to establish network communication, other less direct network interfaces are often available. For example, peer-to-peer network interfaces established directly between two client information handling systems can provide an indirect network interface. For instance, a client information handling system that is out of range of a wireless access point (WAP) can interface with the WAP through a peer-to-peer interface with another client information handling system that has an interface with the WAP. Similarly, mesh networks provide indirect interfaces through multiple client information handling systems to support a client information handling system communication with a destination, such as a WAP. Although mesh networks tend to involve multiple transfers between client information handling system, in certain circumstances a mesh network interface can provide substantial bandwidth. For example, a 60 GHz network interface tends to have a short range but with a relatively large bandwidth, such as 14 Gbps with a WiGiG 802.11ad link. A difficulty with the use of such peer-to-peer and mesh network interfaces is that the interface is generally not as reliable where a client along the communication link may prioritize its network needs ahead of other clients, or may simply go out of range, thus breaking the interface. Thus, indirect network interfaces tend to lack quality control and predictable bandwidth so that use of an indirect network interface as an only interface is generally not appropriate for applications that need reliable network service.

Another difficulty that arises with the use of indirect network interfaces is that such interfaces tend to rely upon wireless communications using radios. A client information handling system typically includes multiple radios that support multiple wireless interfaces. For example, WWAN radios communicate over cellular networks, WLAN radios communicate over 2.4 GHz and 5 GHz frequency bands, and short range high bandwidth WiGiG radios communicate over a 60 GHz frequency band. In enterprise environments where large numbers of information handling systems operate, wireless frequencies can become congested with traffic so that a wireless interface has difficulty finding an open channel on which to communicate. Wireless congestion can lead to communication performance inconsistencies and poor reliability as traffic across enterprise wireless bands varies. Also, network communication through radios is subject to restrictions related to the specific absorption of wireless signals into end users of a client information handling system. Specific Absorption Rate (SAR) requirements, restrict the amount of radiation from a wireless device that can be absorbed by a human body. Although a wireless network interface available at a client information handling system may offer greater bandwidth than other options, the actual bandwidth is sometimes restricted by SAR requirements so that the interface with the greatest bandwidth may not in fact provide the greatest bandwidth where a radio used for a wireless network interface has to reduced power statically or dynamically in response to use cases. Reduced transmit power tends to reduce range and throughput so that data rate and quality of service in the wireless network tend to suffer.

SUMMARY OF THE INVENTION

Therefore, a need has arisen for a system and method which provides multiple network mediums to an application for executing on a client information handling system for communication with an external network.

A further need exists for a system and method that manage multiple network mediums for efficient communication by the application with the external network.

A further need exists for a system and method that manage radio frequency absorption related to wireless network communications medium.

In accordance with the present invention, a system and method are provided which substantially reduce the disadvantages and problems associated with previous methods and systems for communication between a client information handling system and an external network. A client information handling system uses link aggregation to communicate simultaneously through multiple network interfaces by manipulating network packets at a network layer rather than an application layer. Network address translation of an Internet Protocol address in the network packet network layer manages network packet assignment to selected of multiple network communication mediums and provides masking of the multiple communication mediums from the external network. Network communications are optimized with analysis of network communication medium states to drive network packets to network communication mediums efficiently. For example, SAR limits tracked at wireless network communication mediums helps to direct network traffic through network medium without impacting wireless transmit power.

More specifically, a client information handling system processes information by executing instructions stored in memory on a processor interfaced with the memory, such as by executing an application. The client information handling system includes plural network interfaces to communicate with external networks, such as supported by a network interface card (NIC) that communicates through wired network interfaces and a wireless network interface card (WNIC) that communicates through wireless network interfaces. Some examples of network interfaces that a client information handling system may have include Ethernet, USB or other serial links, 802.11 (b, g, n and ac) wireless local area networks that operate on 2.4 and/or 5 GHz frequency bands, 802.11ad WiGiG networks that also operates on a 60 Ghz frequency band, and other wireless communication protocols. A link aggregation module cooperating with the application and the network interfaces coordinates communication of network packets from the application to the external network through plural of the network interfaces. For example, the link aggregation module establishes a link aggregation table in cooperation with an access point that interfaces with the external network. The link aggregation table relates the application with Internet Protocol addresses of the plural network interfaces and a port. The link aggregation module modifies network packets by performing a network address translation at the network layer of the network packet to insert the multiple network interface Internet Protocol addresses for communication to the access point. The access point performs a similar network address translation to send outbound network packets for the application under a common aggregated Internet Protocol address. Inbound packets received at the access point that have the aggregated Internet Protocol address are directed to a selected of the client information handling system network profiles with a network address translation at the network layer that replaces the aggregated Internet Protocol address with the desired network interface protocol address. A link aggregation optimizer analyzes network interface conditions to distribute application network packets between the network interfaces in an efficient manner.

The present invention provides a number of important technical advantages. One example of an important technical advantage is that a client information handling system application communicates with an external network simultaneously through plural network interfaces. The availability of plural network interfaces improves bandwidth at the client information handling system for more rapid application data transfers and improves network communication reliability by having multiple communication paths to the external network in the event of failures related to any particular network medium. Analyzing available network mediums and comparing the network medium capabilities against application requirements allows efficient distribution of network communications across the plural network mediums for an improved end user experience. An aggregated Internet Protocol address coordinated with an access point ensures that the external network views the application network packets as coming from the same source. Optimized aggregation of an application's network packets provides the application with simultaneous network access through conventional local area network (LAN) and wireless local area network (WLAN) infrastructures while also leveraging indirect external network accesses through peer-to-peer and mesh network infrastructures. Application-specific bandwidth, SAR quality of service, and other requirements may be addressed in an optimal manner on a functional basis, such as by performing large data transfers through mesh network interfaces in background while carrying voice with Ethernet and quality of service guarantees. As an example, an access point and client information handling system share Gigabit Ethernet, 802.11ac having 1.3 Gbps (such as 3×3, 80 MHz) and 802.11ad having up to 7 Gbps. Communicating separately the maximum communication rate is the maximum speed of the highest speed link.

Communicating as an aggregated link, leveraging all three communication links provides a data rate of 9.3 Gbps.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A client information handling system leverages network address translation of a network layer Internet Protocol address to support application interactions through plural network interfaces. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
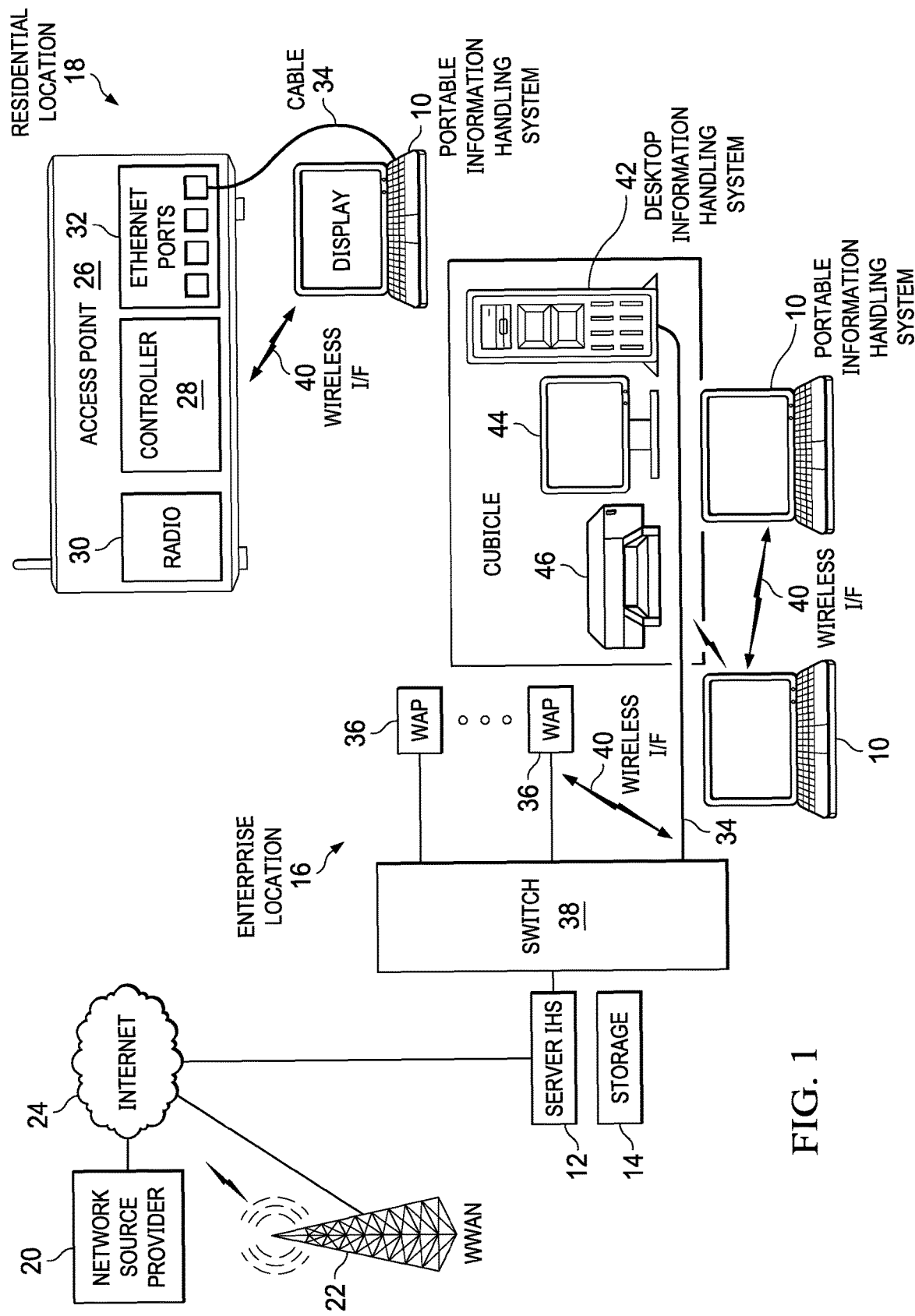
FIG. 1 depicts a block diagram of an example of client information handling systems communicating with external networks.

Referring now to FIG. 1, a block diagram depicts an example of client information handling systems 10 communicating with external networks. In the example embodiments, client information handling systems 10 are located at an enterprise location 16, such as a corporate office, and a residential location 18. Other example locations may include education facilities, government offices, public areas, WiFi hotspots, etc. . . . . In the example embodiment, enterprise location 16 supports a local area network (LAN) with a server information handling system 12 that stores enterprise information in a storage device 14, such as an array of solid state or hard disk drives. A switch 38 interfaces with server 12 to coordinate network traffic from a plurality of network devices deployed across the enterprise. The example embodiment depicts portable client information handling systems 10 that interact through wireless interfaces 40, such as 802.11 (b, g, n, ac and ax) wireless local area networks (WLANs) supported through wireless access points (WAPs) 36. Within cubicles of enterprise location 16, a variety of networked devices may be found, such as desktop information handling systems 42, displays 44 and printers 46. Networked devices interface through Ethernet cables 34, such as CAT V cables, and through wireless interfaces. For example, peripherals and docking stations can interface with switch 38 through cables 34 and offer high bandwidth short range wireless networking with 60 GHz wireless interfaces. The example embodiment residential location 18 includes a similar local area network architecture with an access point 36 that offers Ethernet ports 32 for cable 34 network interfaces and a radio 30 for wireless network interfaces. A controller 28 within access point 26 executes embedded code stored in flash memory to manage communication of network packets.

The example embodiment of FIG. 1 depicts a variety of example communication paths for a client information handling system 10 to interact with an external network, such as Internet 24. Enterprise locations 16 often have server information handling systems 12 that interface with Internet 24 or private wide area networks (WANs) through dedicated telecommunication lines. Residential locations 18 typically rely upon Internet Network Service Providers 20 who provide residences with routers and access points to obtain Internet service. Mobile telephone service providers also offer data access to the Internet through distributed wireless wide area network (WWAN) 22. The example networks of FIG. 1 illustrate that a client information handling system 10 often has a number of external network interface options available to use for communicating with an external network, such as the Internet 24. Generally, client information handling systems identify themselves with an Internet Protocol address assigned by the network service provider or server that provides the client with access to the Internet, which is typically tied to the network medium that the client interfaces through. Within a local area network, dynamic assignment of Internet Protocol addresses is typically managed by a router access point that routes network packets between the local area network and external networks. Those of skill in the art will recognize that the example network architectures set forth in FIG. 1 illustrate network interactions and are not intended to limit the scope of the present disclosure to the example presented.

Figure 2:
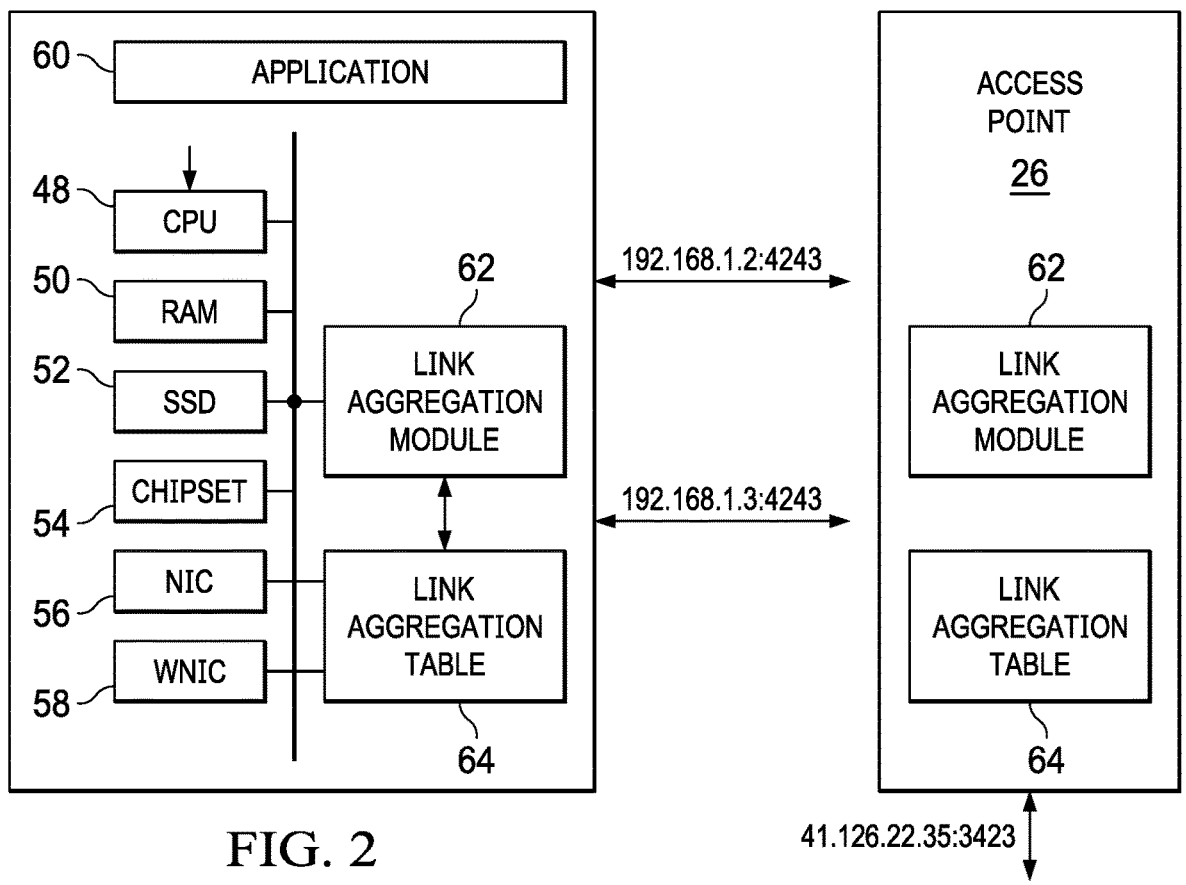
FIG. 2 depicts a block diagram of an example client information handling system interaction through plural network interfaces to an access point for communication with an external network.

Referring now to FIG. 2, a block diagram depicts an example client information handling system 10 interaction through plural network interfaces to an access point 26 for communication with an external network. Client information handling system 10 processes information by executing instructions with a central processing unit (CPU) 48 cooperating with memory, such as random access memory (RAM) 50. Persistent storage, such as solid state drive 52, stores applications 60 and an operating system during system power down. A chipset 54 includes processing elements and embedded code stored in flash memory that coordinates interactions with CPU 48 and peripheral devices on a physical level. In the example embodiment, a network interface card (NIC) 56 provides a network interface through one or more wired connections, such as Ethernet or a serial interface like USB, and a wireless network interface card (WNIC) 58 provides a network interface through one or more wireless connections, such as a wireless local area network (WLAN) or wireless wide area network (WWAN). The example embodiment depicts example physical processing components that cooperate to process information and communicate information through plural networks, and is not intended to limit the scope of the present disclosure, which may apply across client information handlings having a variety of hardware and software configurations.

In the example embodiment, application 60 sends and receives information in the form of network packets through an access point 26 simultaneously through multiple network interfaces, such as a wired network interface supported by NIC 56 (IP address 192.168.1.2:4243) and a wireless network interface supported by WNIC 58 (IP address 192.168.1.3:4243). The multiple network interfaces are coordinated by a link aggregation module 62 at client information handling system 10 and another at access point 26, which track coordinated network interfaces at link aggregation tables 64. Link aggregation module 62 is, for example, embedded code stored in flash memory that executes on a processor, controller or dedicated hardware, to manage network packet address translation at the network layer. In one example, software executing under the management of an operating system coordinates the use of multiple network interfaces without the use of specialized hardware. In another example embodiment, a digital signal processor (DSP) integrated in chipset 54 receives network packets from application 60 that are prepared to send through a single network interface in a conventional manner. Application 60, for instance, may have coordinated with an operating system to communicate with the Internet through an Ethernet cable coupled to NIC 56. Link aggregation module 62 receives the network packets from the application, selects a network interface to send the network packet, and performs a network layer address translation to insert an Internet Protocol address of the selected network interface into the network packet. Once the network packet is translated to a selected network address, link aggregation module places the network packet into the network interface device associated with the selected network interface and sends the network packet through that network interface to access point 26. Similar handling of incoming network packets provides application 60 with access to multiple network interfaces to accept network packets. As network packets arrive at NIC 56 and WNIC 58, the network packets are forwarded to link aggregation module 62 where network address translation is performed to insert an Internet Protocol address in the network layer that is expected by application 60. Inbound network packets with the translated network address expected by application 60 are then forwarded to application 60 for processing in a conventional manner.

In one aspect of the present disclosure, application 60 is provided with multiple network interfaces through network address translation at a client information handling system so that application 60 is, essentially, tricked to view the multiple network interfaces as a single interface. In order to coordinate network communication for the application with an external network, the server information handling system or other target of the application network packets should know that network packets from the application have the same source application even though the source Internet Protocol address reflects different network mediums of the client. In the example embodiment depicted by FIG. 2, access point 26 manages the assignment of Internet Protocol addresses so that an aggregated Internet Protocol address is presented for the application to the external network. In the example embodiment, access point 26 assigns an Internet Protocol address to client information handling system 10 in a conventional manner, such as with a DHCP dynamic address process that leverages a globally unique address provided from an Internet Service Provider or enterprise server or a locally unique IP address like 192.168.x.x. Application 60 coordinates external network communication using a network interface and associated Internet Protocol address assigned by an operating system. Link aggregation module 62 then coordinates the use of multiple network interfaces by inserting aggregate Internet Protocol addresses with network address translation. In the example, link aggregation module 62 associates in link aggregation table 64 the Internet Protocol addresses of the two selected network interfaces (192.168.1.2 and 192.168.1.3) with a port for application 60 (4243). The association is stored in link aggregation table 64 of access point 26, where an aggregate Internet Protocol address (41.126.22.35) and port (3423) is also associated with the application and used through network address translation to present application 60 network packets to an external network as from a same source address. Although the example embodiment presents the use of an aggregated Internet Protocol address from access point 26, different aggregations may be used at different network locations, such as by coordinating the aggregation at the target server of the network packets itself. For example, a combination of peer-to-peer, mesh and WLAN network interfaces may all communicate network packets of a client application to a common location outbound to an external network so that one or more network address translations are performed at one more intermediate local area network locations before communication to the external network is performed using a common aggregated network layer Internet Protocol address. Ultimately, at egress to the external network, multiple Internet Protocol addresses of the local area network are coupled by the egress device, such as an access point, by advertising the multiple Internet Protocol addresses as a single public/private Internet Protocol address.

Figure 3:
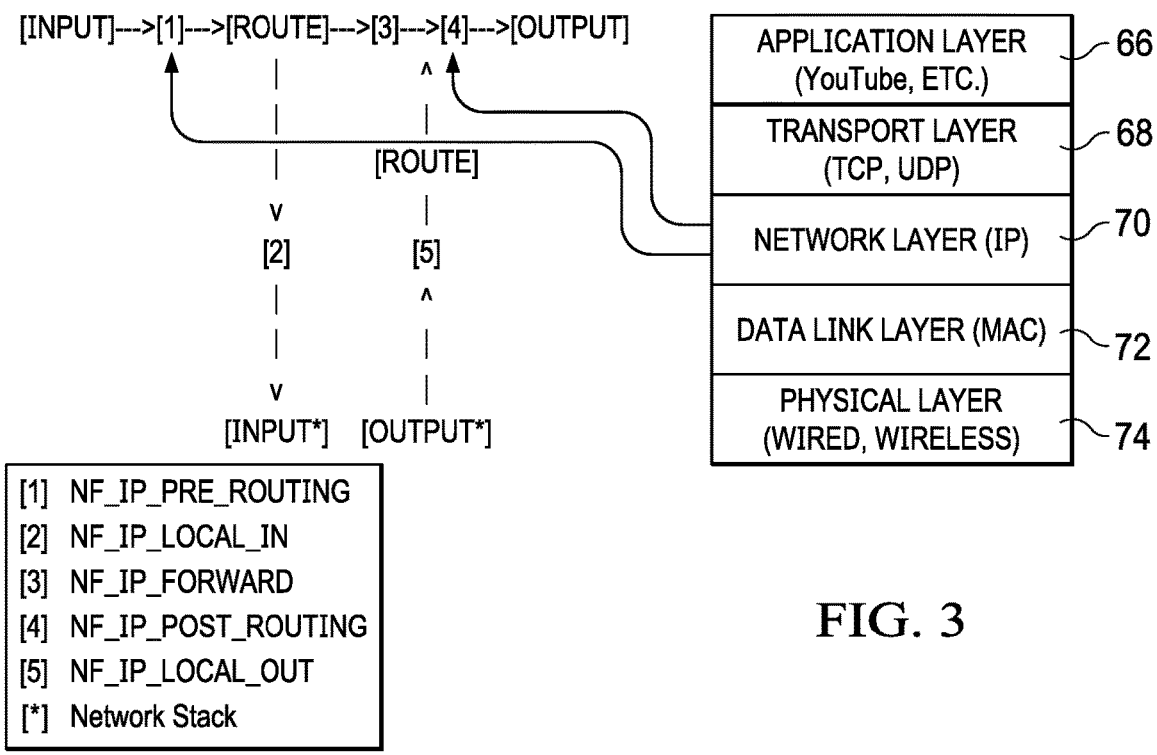
FIG. 3 depicts an example network application packet that is presented to illustrate network translation at the network layer.

Referring now to FIG. 3, an example network application packet is presented to illustrate network translation at the network layer of a client information handling system. In the example embodiment, the network packet includes a physical layer 74, such as to track wired or wireless physical interfaces, a data link layer 72, such as that tracks a MAC address of the network device, a network layer 70, such as that tracks source and destination Internet Protocol address, a transport layer 68, such as that tracks TCP and UDP routing, and an application layer 66 that holds application information. During sending of a network packet from a client information handling system application, the application provides a partially completed network packet to the network aggregation module, which, as part of the pre-routing outbound processing described below in FIG. 4, replaces the source Internet Protocol address of network layer 70 with the aggregate Internet Protocol address, such as the address of the network interface selected from the network aggregation table to send the network packet. Once the network layer 70 has the network address translated, the network packet is pushed to the network stack for transmission by the defined network interface of the client information handling system. A similar translation takes places for inbound network traffic to client information handling system 10, as described below in FIG. 5. The inbound network packet is translated at network layer 70 as network packets arrive from the network stack with an aggregate Internet Protocol address defined in the network aggregation table. The network packet is translated to replace the aggregate address with the application network address and then forwarded to the application. In various network architectures, the network layer may be managed as appropriate. As described in FIGS. 6 and 7, network address translation is performed at an access point or other external device that receives and sends network packets to client information handling system 10.

Figure 4:
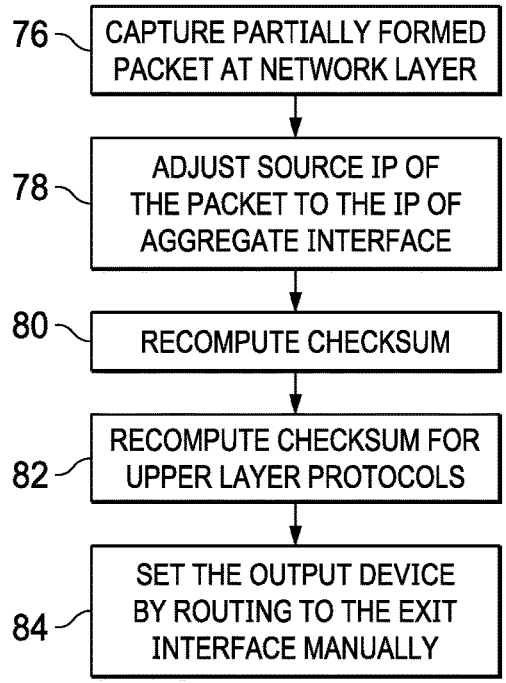
FIG. 4 depicts a flow diagram of a process for network address translation at a client information handling system post-routing hook for a network packet leaving a client a flow diagram of a process.

Referring now to FIG. 4, a flow diagram depicts a process for network address translation at a client information handling system post-routing hook for a network packet leaving a client application. Post-routing generally refers to processing done on a packet at a client for outbound communication. At step 76, a network packet leaving an application for the network stack is captured when partially formed at the network layer. At step 78, the source Internet Protocol address of the packet is adjusted to instead have an Internet Protocol address of one of the supplementary non-default network interfaces. For instance, in the example embodiment each network packet leaving the application has the network layer Internet Protocol address replaced to use an aggregate address from the network aggregate module table. At step 80, the network packet network layer checksum is re-computed to consider the translated Internet Protocol address and added to the network layer. At step 82, the checksum is re-computed for the upper layer protocols and added to the network packet. At step 84, the output device to receive the network packet is set and the network packet is manually set to route to the exit interface for transmission through the associated network interface with the translate network address inserted.

Figure 5:
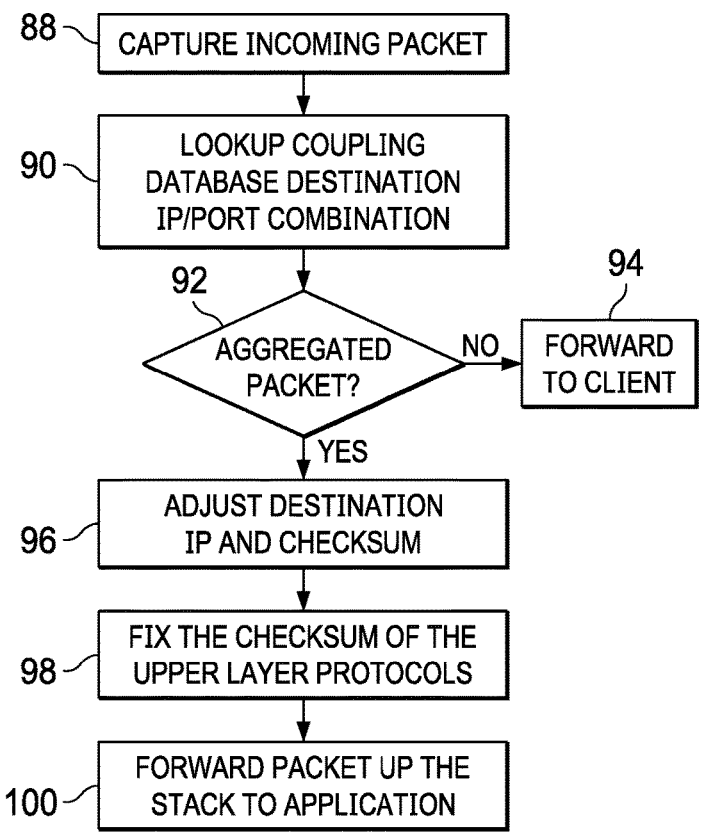
FIG. 5 depicts a flow diagram of a process for network address translation at a client information handling system pre-routing hook for a network packet arriving at a client application.

Referring now to FIG. 5, a flow diagram depicts a process for network address translation at a client information handling system pre-routing hook for a network packet arriving at a client application. Pre-routing generally refers to processing done on a packet a client for inbound communication. The process starts at step 88 with capture of an incoming packet from a network interface off the client information handling system network stack. At step 90, a look is made to the link aggregation table for the incoming packet and at step 92 a compare is made of the network packet destination Internet Protocol address and port combination against aggregate network addresses in the link aggregation table. If the incoming network packet matches an aggregate address, the process ends at step 94 with forwarding of the network packet to the client information handling system. If at step 92 the incoming packet matches a coupled Internet Protocol address and port of the link aggregation table, the process continues to step 96 to adjust the destination Internet Protocol address of the network packet to the address and port expected by the client information handling system application as defined in the link aggregation table. The destination Internet Protocol address is translated and check sum adjusted for the new address. At step 98, the checksum of the upper layer protocol is adjusted to account for the translated Internet Protocol address. At step 100, the network packet is forwarded up the network stack to the application for processing.

Figure 6:
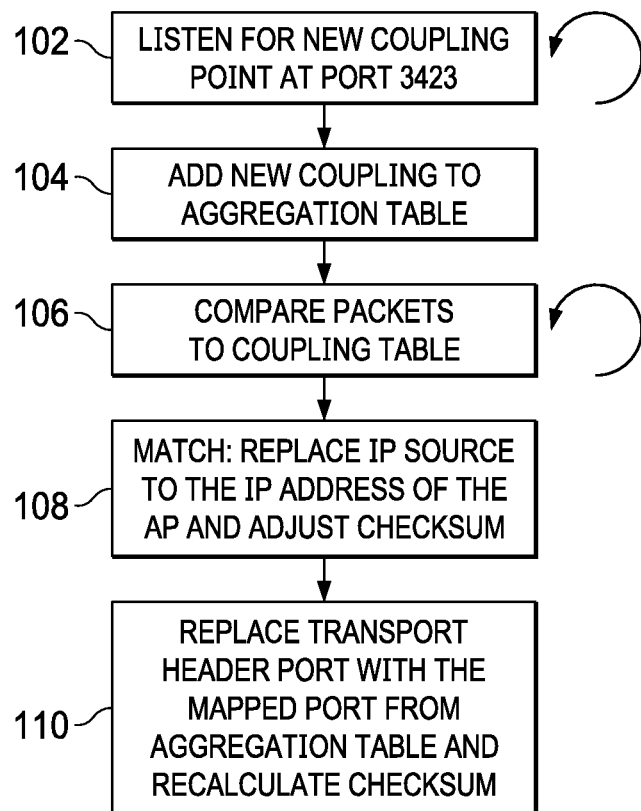
FIG. 6 depicts a flow diagram of a process for network address translation at an access point post routing hook for a network packet arriving at the access point from clients.

Referring now to FIG. 6, a flow diagram depicts a process for network address translation at an access point post routing hook for a network packet arriving at the access point from clients. Post-routing generally refers to processing done on a network packet at an access point for inbound communication from a client information handling system. The process starts at step 102 by listening for new coupled network addresses requested by a client information handling system on a defined port, such as port 3423. For example a state machine executing on a controller of the access point listens for requests with port 3423 and applies the requests to add or delete coupled relationships of the access point's link aggregation table. If a coupling request is received, at step 104 an entry is made to the link aggregation table so that detection of a source Internet Protocol address associated with the coupling request will result in network translation of the outbound network packet to include an aggregated Internet Protocol address. At step 106, network packets coming into the access point are compared against values in the link aggregation table to determine if the sources Internet Protocol address matches a value in the link aggregation table. As an example, a state machine or dedicated hardware device compares the network packet and link aggregation table Internet Protocol address to determine matches. At step 108, as matches are detected, a network address translation is performed to replace the network packet source Internet Protocol address with an aggregated Internet Protocol address defined by the link aggregation table of the access point, including a re-calculation of the network layer checksum to include the aggregate Internet Protocol address. Thus, for instance, network packets from a common client application received through plural network interfaces with plural source Internet Protocol addresses are adjusted to have a common aggregate Internet Protocol address defined by the access point's link aggregation table. At step 110, the adjusted network packets are further processed to replace the transport header port with the mapped port of the link aggregation table and the transport layer checksum is recalculated. In this manner, network packets from the client application proceed out of the access point presenting an appearance of having been sent through the same client network interface with the access point aggregate address masking the local area network at the network layer for address manipulation.

Figure 7:
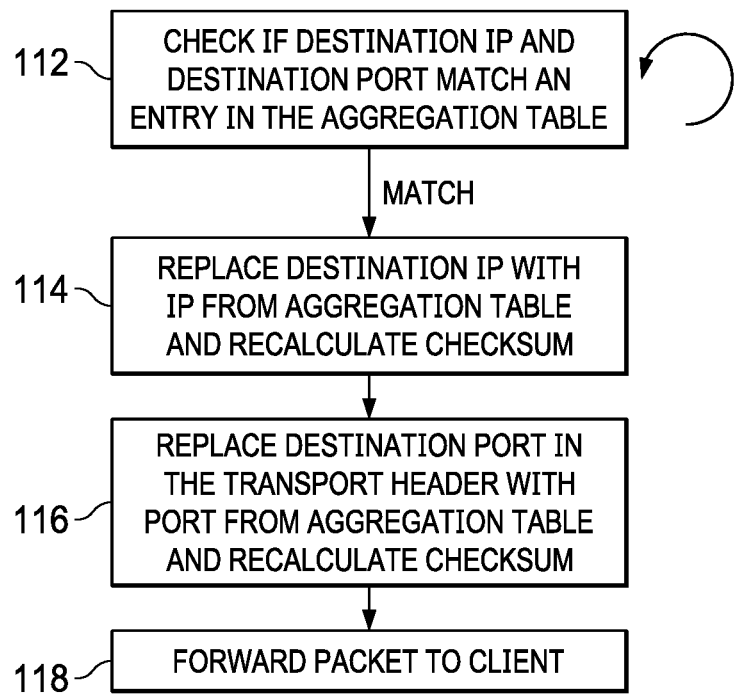
FIG. 7 depicts a flow diagram of a process for network address translation at an access point pre-routing hook for a network packet leaving the access point towards the client information handling system.

Referring now to FIG. 7, a flow diagram depicts a process for network address translation at an access point pre-routing hook for a network packet leaving the access point towards the client information handling system. Pre-routing generally refers to processing done on a packet at an access point for outbound communication to a client information handling system. The process starts at step 112 by checking if destination Internet Protocol addresses of incoming network packets match an IP address and port of the access point link aggregation table, such as a with a comparison of the packet port and aggregate ports defined by the link aggregation table. If a match is found, the process continues to step 114 to replaces the destination Internet Protocol address of the network packet with an Internet Protocol address of the link aggregation table and recalculate the network layer checksum. In an example embodiment, the replacement address may be selected from plural available addresses of the link aggregation table where each replacement address forwards the network packet to an associated network interface of the client information handling system. Selection of an address may be defined by rules or an optimized analysis of the available network paths as set forth below. At step 116, the destination port in the transport header is replaced with the port from the link aggregation table and the transport checksum is recalculated. At step 118, the network packet in translated form is then forwarded from the access point to the internal network for communication to the client information handling system through the network interface defined by the replacement address and port.

Figure 8:
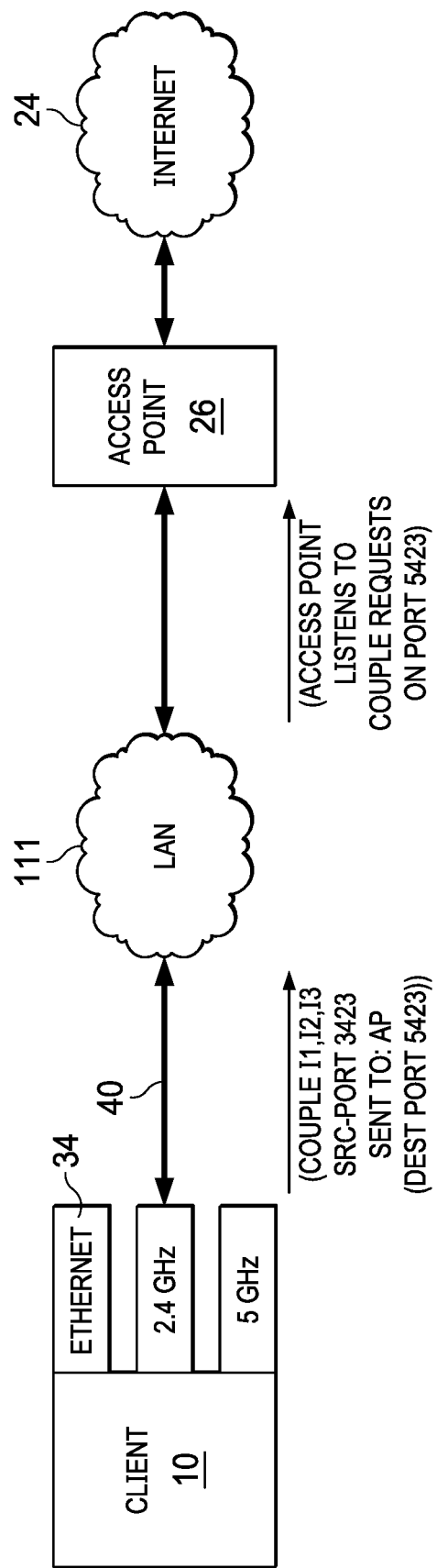
FIG. 8 depicts a block diagram of an example aggregation configuration of multiple client information handling system network interfaces through an access point to the Internet.

Referring now to FIG. 8, a block diagram depicts an example aggregation configuration of multiple client information handling system network interfaces through an access point to the Internet. In the example embodiment, client information handling system 10 includes three network interfaces interfaced with a local area network (LAN) 111: an Ethernet interface 24, a 2.4 GHz wireless interface 40, and a 5 GHz wireless interface 42. An access point 26 interfaces with LAN 111 and to Internet 24. When an application on client information handling system 10 wants to interface with Internet 24 using multiple network interfaces, client 10 sends a coupling request through any of the available network interfaces to the access point to couple the application's network communications through a link aggregation table entry. The coupling request is sent from a source port associated with such requests, such as source port 3423 in the example, to a destination port associated with handling such requests, such as destination port 5423 in the example. Access point 26 listens at the identified destination port for the request source port and, when a coupling request is detected, enters the coupling of the client interfaces at a link aggregation table of access point 26. In the example embodiment, coupling of client network interfaces is managed with source Internet Protocol addresses and ports, however, in alternative embodiments other types of associations may be used. For example, a client application might gather available client network interface addresses to send a coupling request to a target server information handling system or an intermediate network device that aggregates client network packets. In addition, coupling may occur over multiple access points or network devices so that ultimate aggregation of a client application's network packets may occur at multiple egress points from a local network to an external network. For instance, once access point 26 establishes a coupling in a link aggregation table, the coupling may be forwarded to other links within LAN 111 so that any link receiving a client application network packet will translate that network packet to have an appropriate aggregate network address.

Figure 9:
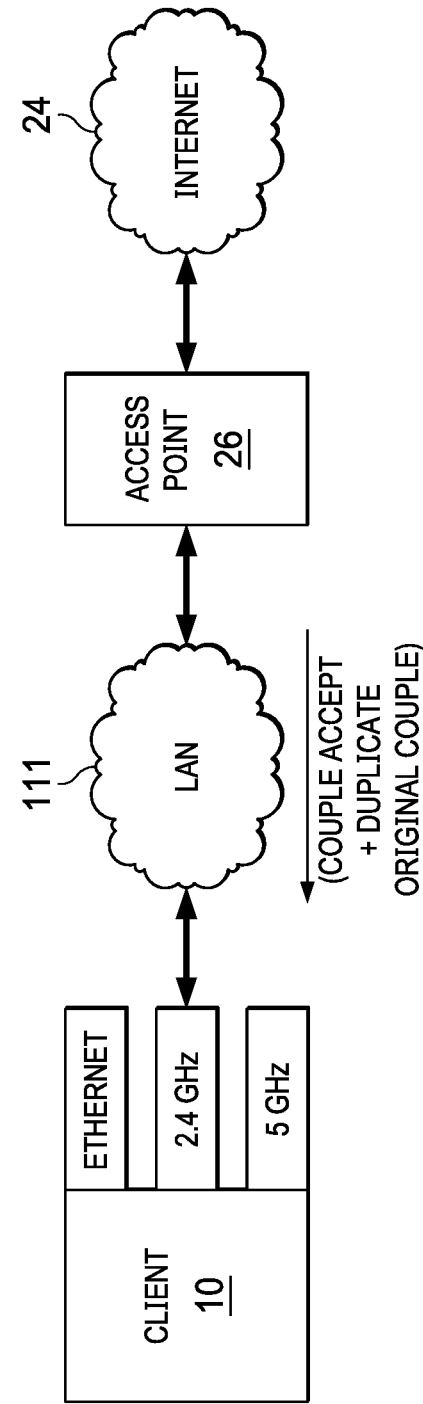
FIG. 9 depicts a block diagram of an example aggregation configuration confirmation of multiple client information handling system network interfaces at an access point.

Referring now to FIG. 9, a block diagram depicts an example aggregation confirmation of multiple client information handling system network interfaces at an access point. Once access point 26 has entered a coupled address relationship in its link aggregation table, access point 26 sends confirmation of acceptance of the aggregation to client information handling system 10 with a duplicate of the original link aggregation table entry. Client information handling system 10 enters the confirmed coupling as an entry to the client link aggregation table and may then initiate the use of any and/or all of the network interfaces to communicate application network packets to an external network. Similarly, access point 26 may send network packets received from an external network to any of the client network interfaces defined by the coupling of the link aggregation table. As described below in greater detail, the availability of multiple network interfaces may be leveraged to achieve desired communications goals by selection of network interfaces associated with the goals, such as bandwidth, quality of service, etc . . .

Figure 10:
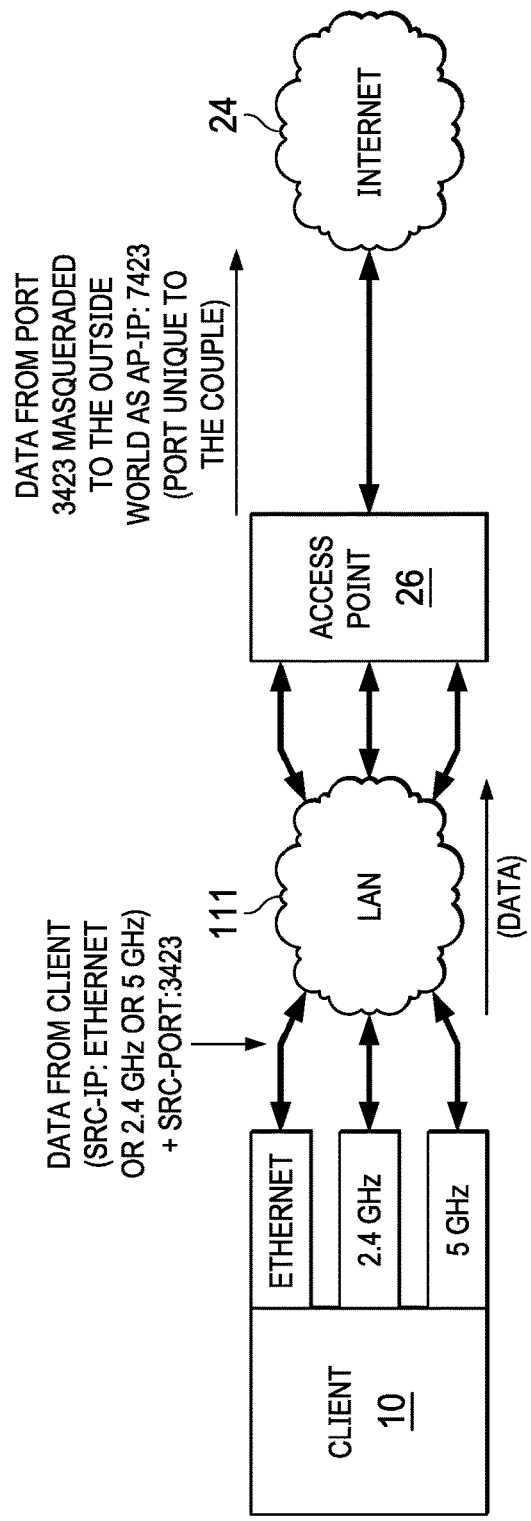
FIG. 10 depicts a block diagram of an example of network packet communication through multiple network interfaces leveraging client network interface couplings defined by the network aggregation table.

Referring now to FIG. 10, a block diagram depicts an example of network packet communication through multiple network interfaces leveraging client network interface couplings defined by the network aggregation table. Application data from client information handling system 10 is sent through any of the three network interfaces 34, 40 and/or 42 with the network interface's source Internet Protocol address and source port 3423, which indicates the coupling to access point 26. As access point 26 receives network packets that include port 3423, access point 26 identifies the coupling and performs network address translation to present the client application network packets to Internet 24 as sourced from a common Internet Protocol address and a port of 7423 associated with the coupling. In this manner, as data reaches the destination of each network packet, the target device sees the network packets as commonly sourced and processes the network packets as such with response network packets returned to the access point's "masquerade" destination Internet Protocol address and port. As access point 26 receives the response network packets, with the coupling Internet Protocol address and port, access point 26 translates the response network packets to one of the three client Internet Protocol addresses and the client coupling port of 3423 and sends the network packet to the client through the translated network address.

Figure 11:
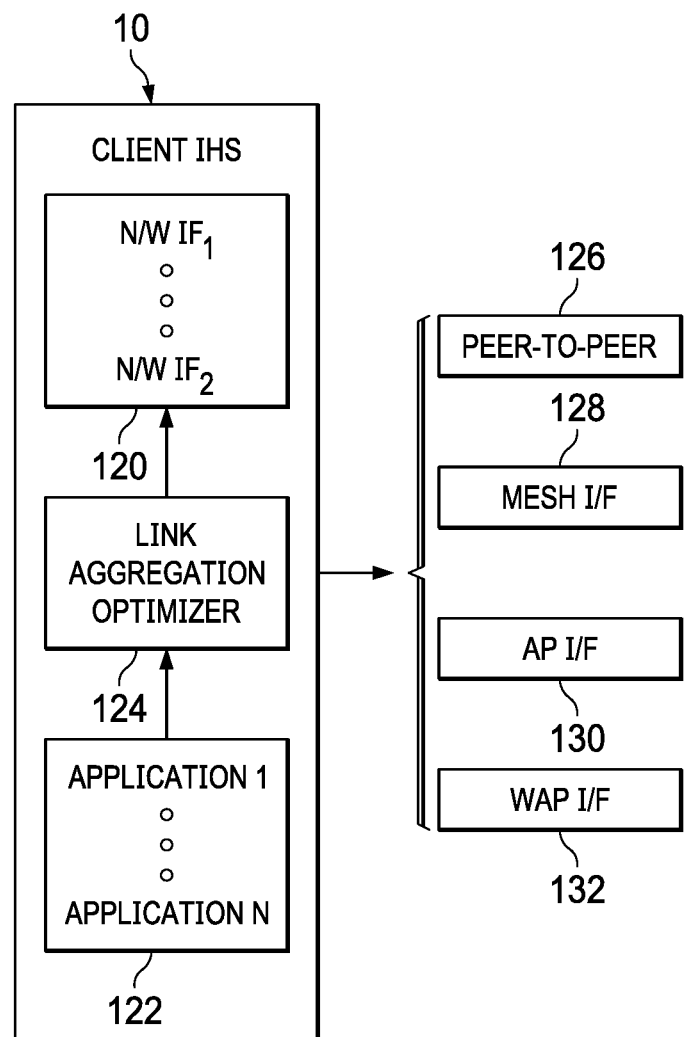
FIG. 11 depicts a block diagram of selection of client network interfaces to optimize desired network communication parameters.

Referring now to FIG. 11, a block diagram depicts selection of client network interfaces 120 to optimize desired network communication parameters. As described above, applications at a client information handling system 10 leverage multiple network interfaces 120 to communicate with an external network by coordinating an aggregate Internet Protocol address through defined ports. In complex local area network architectures, such as are commonly found in enterprise locations, client network interface paths may diverge and converge at different locations, including locations external to a local area network. As an example, a client information handling system at an enterprise location may include cellular network data service through an enterprise account that offers a network interface through a wireless wide area network (WWAN) account of the enterprise. Link aggregation that leverages the WWAN interface may improve communication through put and reliability at an acceptable cost with a variety of configurations, however, may present undesired complexity and cost in other configurations. Similar advantages and disadvantages may be implicated with other available network interfaces available at a client information handling system 10, such as peer-to-peer interfaces 126, mesh interfaces 128, access point interfaces 130, and wireless access point interfaces 132, all of which may or may not follow same network path to the external network of interest.

A link aggregation optimizer 124 executing on client information handling system 10 manages available network interfaces to help ensure efficient leveraging of communication assets for an optimized communication experience at client information handling system 10. Link aggregation optimizer 124 weighs the requirements of applications 122 against the characteristics of available network interfaces to select network interfaces for use by each application and to distribute network communications between the network interfaces in an optimal manner. For a given application executing on a client information handling system, link aggregation optimizer 124 may, for example, select a network interface to handle all outbound network communication, another network interface to handle all inbound network communications, and a third network interface to handle all background data transfer functions of an application. As another example, one active application, such as a game, may be assigned all available network interfaces, such as all WiGiG network interfaces, while other applications, such as email, are restricted to one network interface, such as WiFi. By associating application functions with particular communication needs, applications 122 have increased communication efficiency for an improved end user experience. Further, application network interface selection and distribution may be adjusted as conditions at client information handling system 10 change. For instance, applications that fall out of focus may have their communication priority decreased with network packets distributed to a less reliable network interface. As another example, communication characteristics may shift over time for the different network interfaces so that changes in application network packet distribution may be performed to optimize network communications as the conditions change. Such shifts may occur with peer-to-peer and mesh network interfaces as the systems supporting the interfaces change positions, as the wireless bands involved become more and less busy, and as other processing and communication tasks otherwise impact the link quality and reliability.

Figure 12:
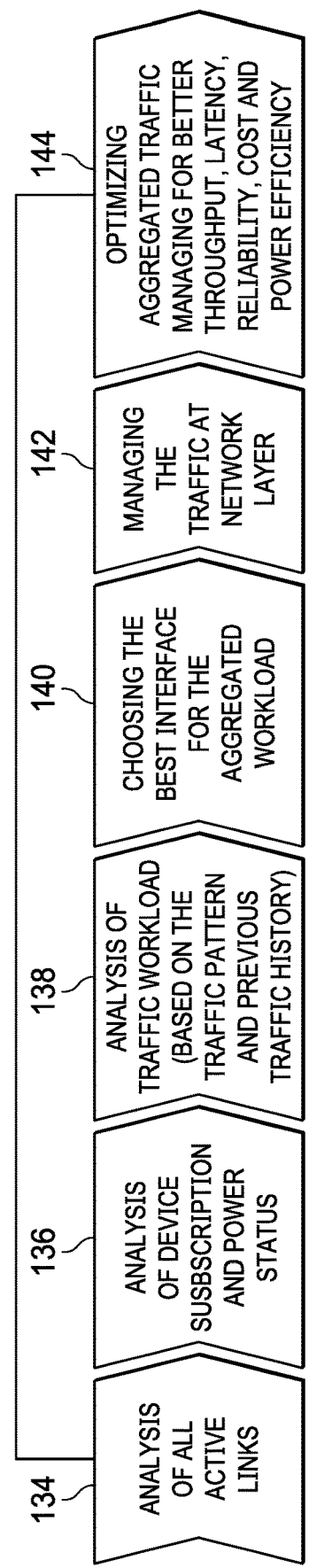
FIG. 12 depicts a flow diagram of a process for adapting available network interfaces to support an aggregated communication link at a client information handling system application.
Figure 13:
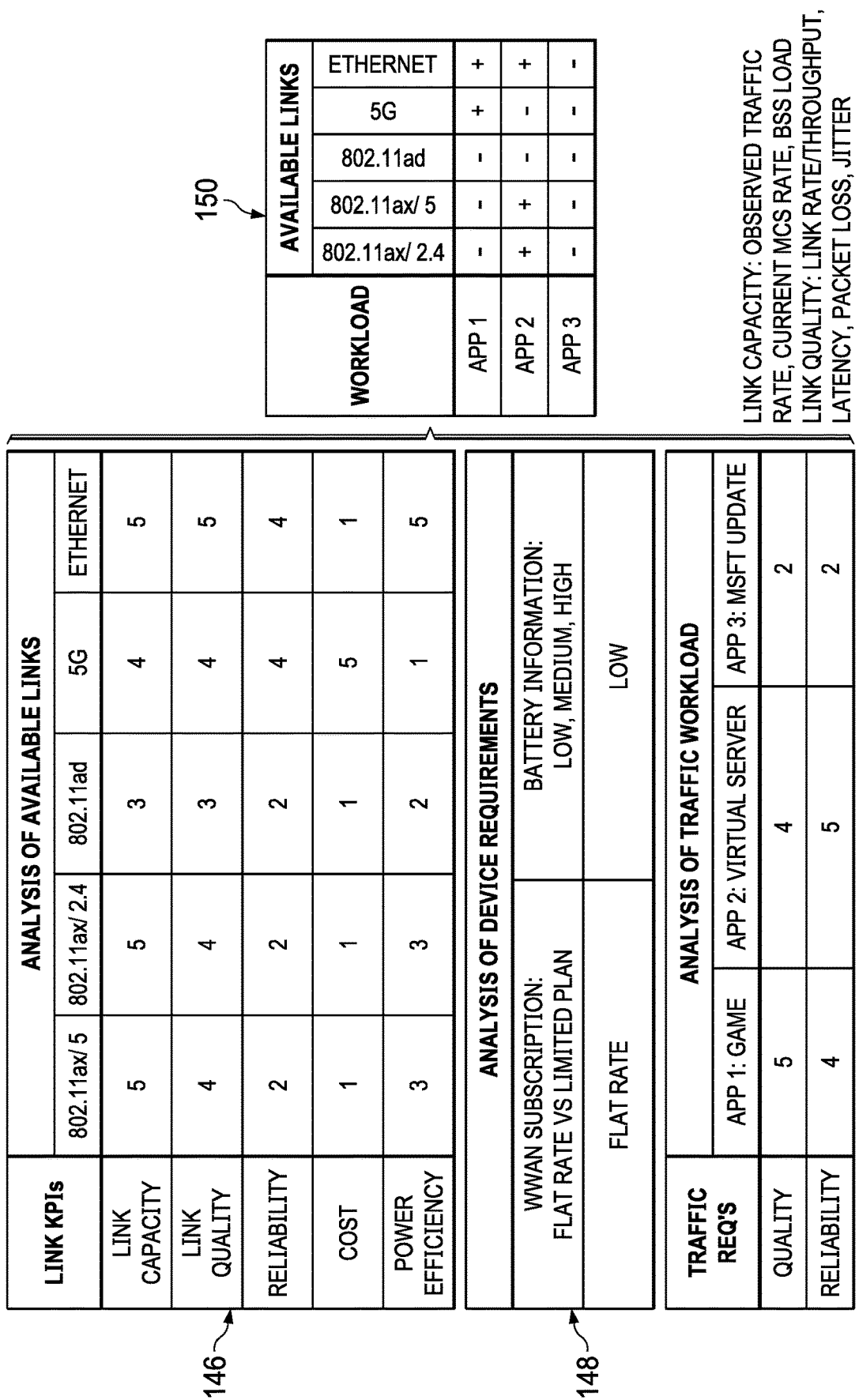
FIG. 13 depicts various tables maintained by a link aggregation optimizer to aid in the analysis and selection of network interfaces for a client application.

Referring now to FIG. 12, a flow diagram depicts a process for adapting available network interfaces to support an aggregated communication link at a client information handling system application. The process starts at step 134 with analysis of all active network interfaces at the client information handling system. FIG. 13 depicts various tables maintain by a link aggregation optimizer to aid in the analysis and selection of network interfaces for a client application. As illustrated by the example table of FIG. 13, link analysis includes a variety of network interface characteristics 146, such as link capacity, link quality, link reliability, link cost and link power efficiency. At step 136, an analysis is performed of the client and network device subscription and power status. FIG. 13 table 148 analysis of device requirements illustrates device requirements that may relate to both the client communicating the network packets and the network devices potentially involved in the communication paths if selected by the link aggregation optimizer. For example, WWAN network interfaces may include a flat or variable plan so that the cost could vary based on plan rates. As another example, a peer or mesh network interface device could lean on a WWAN network interface to access an external network that involves a different cost. In another example, the availability of external power versus the battery charge state of a client and network devices impact that selection of network interfaces that have varied power consumption. For instance, shorter range WiGiG 60 GHz interfaces tend to have lower transmit powers that may be preferred where a client information handling system has limited power availability. Implementation of higher power consuming network interfaces may still be performed, for instance, with network packets that have quality of service demands while lower power and less reliable network interfaces are used to perform application functions that demand less reliable or lower quality network interfaces At step 138, an analysis of network traffic workload is performed based upon detected traffic patterns and previous network traffic history. As an example of network traffic workload analysis, a static white list may be kept that defines the network traffic requirements of client applications. When an application initiates that is on the client white list, the values stored on the white list provide an initialization set of parameters from which further optimization may be performed. In one embodiment, if client responsiveness remains within a threshold that indicates adequate network communication rates, further optimization may prove unnecessary so that the network interface is maintained as defined by the whitelist. Alternatively, the application white list may be updated as network conditions and application operating constraints change. For example, observations about traffic patterns and traffic quality are compared against traffic requirements based upon successful and lost packet metrics to adjust distribution of network packets through the plural network interfaces used by each application. As depicted by the workload table 150 of FIG. 13, each application may have different available network interfaces assigned as workload requirements shift with a dynamic shift of network traffic associated with applications between multiple network interfaces. For example, under one example set of conditions, an application may choose to communicate through multiple interfaces with 20% of packets through a more reliable network interface, such as Ethernet, while the remaining 80% of packets pass through a less reliable network interfaces, such as a mesh network, based upon loading and alignment with defined use cases. At step 140 the best interface is chosen for the aggregated workload. At step 142 communication of traffic is managed at the network layer. At step 144 aggregated traffic is optimized by managing for better throughput, latency, reliability, cost and power efficiency.

Figure 14:
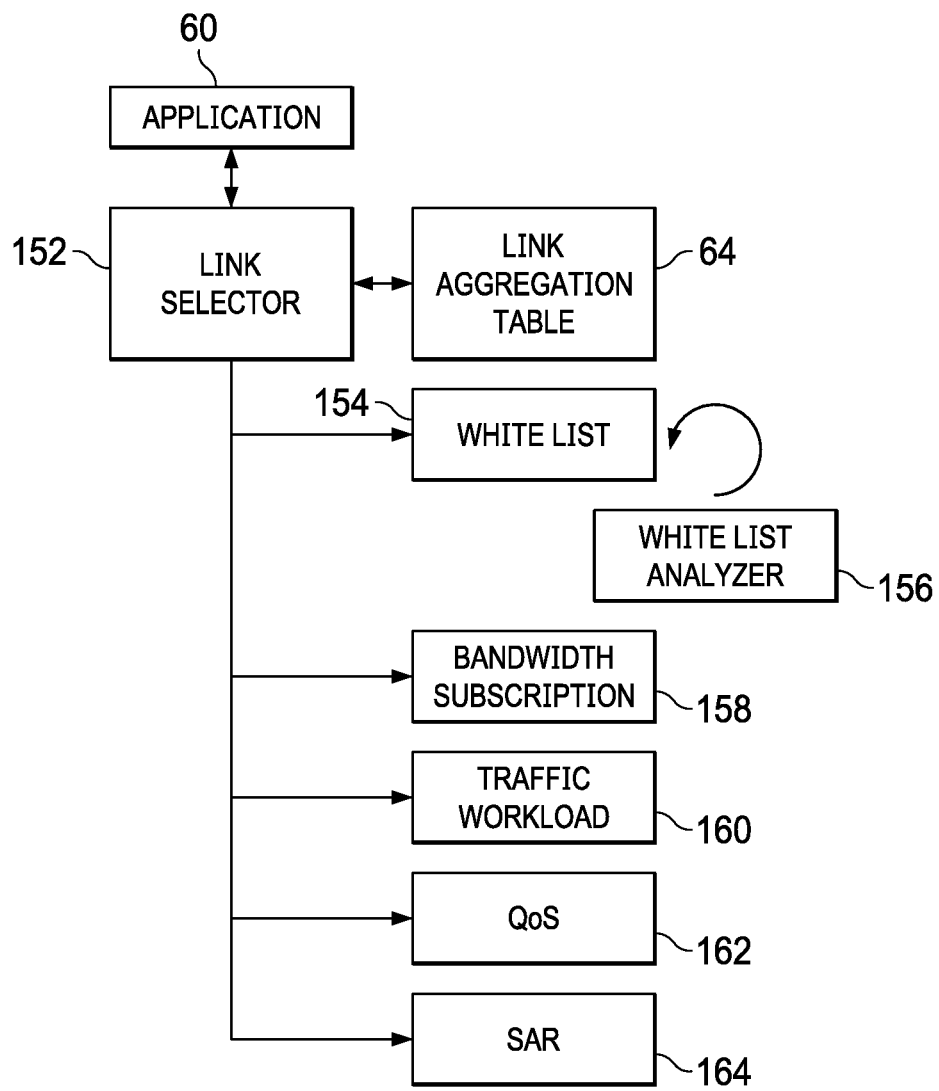
FIG. 14 depicts a block diagram of various factors considered in assignment of network interfaces to an application and distribution of network packets between the network interfaces.

Referring now to FIG. 14, a block diagram depicts various factors considered in assignment of network interfaces to an application and distribution of network packets between the network interfaces. Application 60 interfaces with a link selector 152 that references available network interfaces established for the application in link aggregation table 64 to determine which network interfaces to use for application network packets sent from application 60. As a starting point, link selector 152 references network interfaces defined by a whitelist 154 to initiate the distribution of network packets from the application to the external network. An advantage of reference to whitelist 154 is that sharing the whitelist contents with an access point 26 ensures that a similar balance of return network packets will be achieved by the access point for inbound packets from the external network to the application. That is, the access point will perform distribution of packets to the application through the network interfaces available to the access point based upon parameters derived from whitelist 154. Over time, a whitelist analyzer 156 adjusts the whitelist parameters to reflect improvements for initialization by the application of an external network interface with plural local network interfaces. In the example embodiment, the whitelist maintains optimal initialization parameters for the application, however, in alternative embodiments more recent data may be kept that aims to open the network interfaces closer to an optimal configuration.

Bandwidth and subscription parameters 158 define data capacity and cost for different network interfaces. In one embodiment, link selector 152 manages distribution of network packets between available network interfaces to obtain a minimum data capacity needed by the application with a minimum cost. For instance, link selector 152 may configure application 60 to communicate network packets over a mesh network and a WiFi network, each lacking guaranteed service but together well-exceeding the application's data transfer needs. In an enterprise environment, wireless communication conditions may vary as enterprise employees have changes in data transfer needs so that network capacity may fall below the needs of application 60. In such a situation, link selector 152 may have a more guaranteed network capacity set aside to rely upon as other network interfaces lose capacity. Generally, peer-to-peer and mesh networks will have a greater number of variables that impact capacity than standard interfaces with fixed access points. However, when peer-to-peer and mesh networks become available, the increased bandwidth may provide a substantial improvement in how network communication is perceived by an end user, thus providing an improved end user experience. Traffic workload parameters 160 provide real time feedback that link selector 152 may reference to adjust network interface selection that meets application 60 needs. In addition, quality of service parameters 162 define the rate of acceptable packet misses that application 60 will tolerate. For instance, telecommunication applications that carry live voice or video feeds will want network interfaces that have less loss so that real time data transfers communicate more clearly. In an example embodiment, for instance, voice of a video conference application may be carried with a guaranteed network service, such as a WWAN, while video is communicated through broader bandwidth but less guaranteed network interfaces, such as 60 GHz mesh interfaces.

As wireless communication devices proliferate in enterprises and residences, link selector 152 is provided with a greater number of selections to establish network links for applications. For example, in a cubicle environment a client information handling system may have several short range but high bandwidth 60 GHz network interfaces available, such as docking station, a printer, a display or a neighbor's docking station. By establishing a mesh network interface where stable 60 GHz interfaces are available, a portable information handling system has an opportunity to obtain both quality of service and bandwidth without cost. If the user moves the portable information handling system so that mesh networks become less reliable, link selector 152 may shift the network traffic towards more reliable long range network interfaces, such as WiFi, while supplementing bandwidth as mess or peer-to-peer interfaces become available. Where a mesh network egresses the local network at an access point having a link aggregation table that defines an aggregate address for the application, the multiple network interfaces work together invisible to the target of the application. For example, even where a mesh and WiFi network interface egress the local network at different access points, the sharing of a link aggregation table between the access points ensures outbound network packets will communicate with a common aggregate source Internet Protocol address and port. To manage the multiple wireless network interfaces within Specific Absorption Requirements, an SAR module 164 monitors transmissions and adjusts network traffic based upon set radiofrequency limits, which may be limited across transmission of multiple wireless network interface radios.

Figure 15:
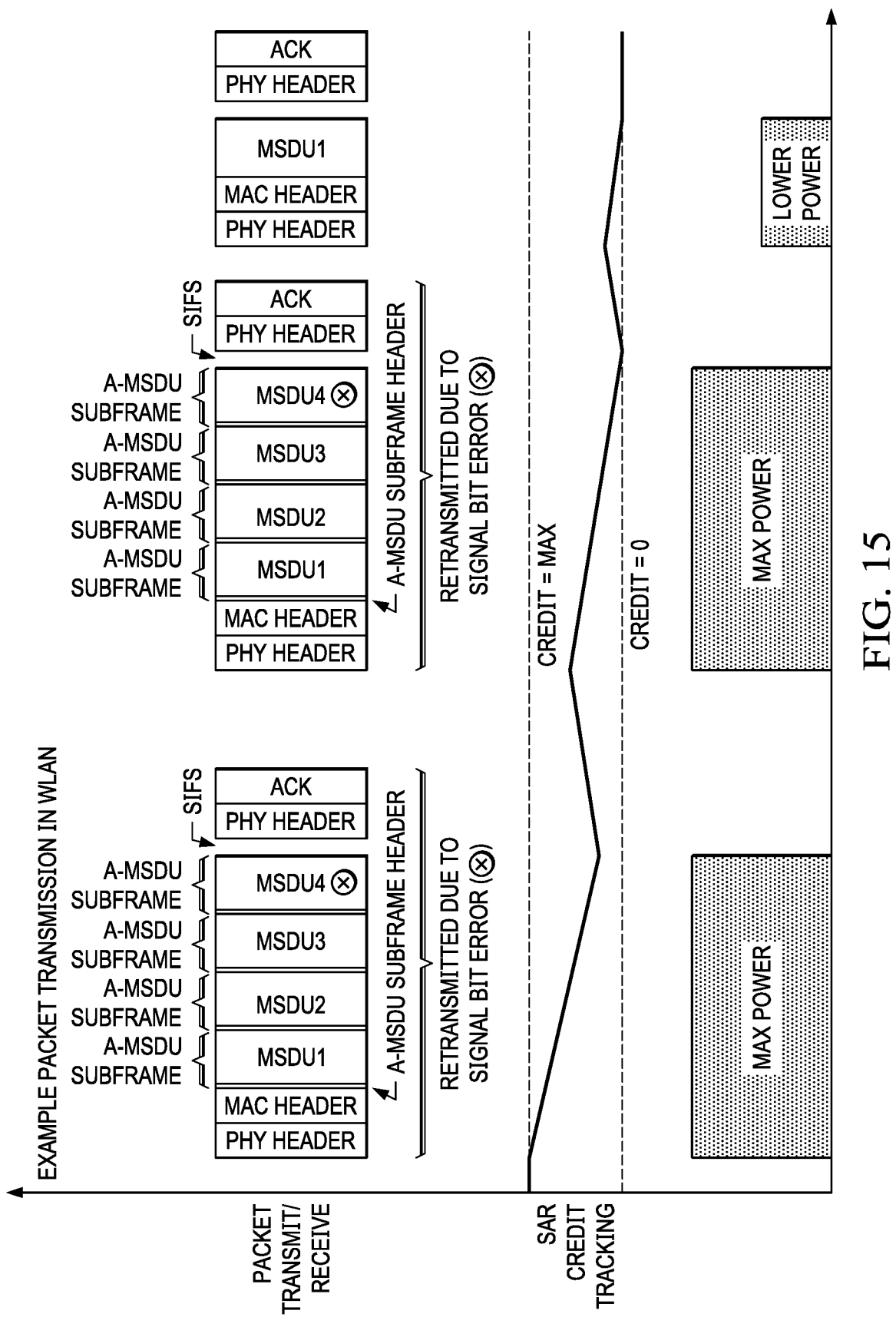
FIG. 15 depicts an example flow diagram of a process for adaptive transmission of network packets with wireless network interfaces.

Referring now to FIG. 15, an example flow diagram depicts a process for adaptive transmission of network packets with wireless network interfaces. For each wireless interface supported by client information handling system 10, SAR limits tracked by SAR parameters 164 may include radio transmit time or a count of network packets sent by each radio so that an estimate of total radio frequency transmit energy is kept as each wireless network interface remains live. For example, transmissions are tracked over a window of time against a threshold of allowed transmissions during a defined time period. In the example embodiment, total transmissions are tracked based upon a credit system in a rotating buffer that counts packets to reduce the credit at transmission and adds credits back once the defined time period expires from the time of transmission, such as every minute. Wireless network radios transmit at full strength while the radio frequency energy remains below a threshold because full power radio transmissions tend to improve network packet transmission effectiveness. As total radio frequency energy over a defined time period approaches a SAR threshold, link selector 152 may implement several options to reduce overall transmit power of the radios. One option is to reduce radio transmit power so that the transmitted signal has less strength that maintains total radiating below a SAR limit. Another option is to alter the distribution of outbound network packets so that a greater number are sent with wired interfaces or with a wireless interface that has less restrictive SAR limits, such as in a different frequency band. Yet another option is to configure the application to send network packets from a wired network interface and receive network packets at wireless network interfaces. When receiving wireless signals at a wireless network interface device, SAR limits are not typically implicated. Thus, network packets received through mesh and peer-to-peer interfaces provide a SAR free option to extend application receive bandwidth even where the number of wireless network interfaces has to be reduced to prevent excessive SAR exposure. The estimate of transmitted radio frequency energy may be kept by counting network packets so that the application can independently estimate if and when wireless network interface outbound bandwidth will be implicated by the SAR limit. In one alternative embodiment, SAR exposure may be adjusted by adaptively modifying Modulation, Code Scheme (MCS) based upon the wireless interface and having a higher MCS when packets are distributed to multiple interfaces.

In various embodiments, bandwidth, power and SAR constraints are cumulatively considered to optimize an end user experience. As an example, an application may rely upon wired network communication, such as through a docking cable or Ethernet interface, for communicating information that an end user accesses frequently. At the same time, background tasks, such as backing up an information handling system to network storage, may be handled with broadband network interfaces that throttle transmissions to remain within SAR limits, such as through a mesh network. Processing tasks that have lower priorities may rely on less reliable mesh networks that communicate on a best efforts basis and shift to more reliable network interfaces as end user priorities shift. For instance, a gaming application may establish Ethernet communications to send real time data, such as interactions with other gamers, while relying on higher bandwidth mesh network communications to download background graphics for which the application does not have an immediate use. As the end user enters a portion of the game that calls for the graphics, download of the graphics may then shift to a more reliable network interface, such as WiFi or Ethernet, until the application is prepared to enter that portion. Dynamic allocation of network communication tasks at the client provide an optimum end user experience that leverages all available communication mediums. In another example embodiment, communication within a local area network is enhanced by providing applications with access to multiple network interfaces, such as to support local communications that do not extend to an external network like the Internet. For instance, an application may assign partial network communication through a mesh or peer-to-peer network that projects information to a television while assigning other network communication through a separate network interface, such as Ethernet. An application is provided with a powerful communication tool that dynamically distributes packets between network interfaces so that the application can target communication goals on the fly, such as data rate, quality of service and reliability. For example, shifting between mesh and WiFi interfaces at a portable information handling system as the end user walks through an enterprise location lets the application dynamically shift network packet traffic on a packet-by-packet basis as wireless signal strength changes on each network interface. For instance, as mesh network signal strength weakens, the application sends a greater percentage of packets through WiFi and vice versa.

Although the present invention has been described in detail, it should be understood that various changes, substitutions and alterations can be made hereto without departing from the spirit and scope of the invention as defined by the appended claims.

What is claimed is:

1. An information handling system having plural network interfaces, the information system comprising:
a processor operable to execute instructions to process information;
memory interfaced with the processor and operable to store the instructions and information;
plural network interfaces operable to communicate information with a network, the plural network interfaces including at least one wireless network interface that communicates with radio signals and at least one wired network interface;
a link optimization module that selects from the plural network interfaces to communicate network packets from an application executing on the processor simultaneously through plural of the network interfaces;
wherein the at least one wireless network interface tracks radio signals communicated in a predetermined time period to detect a threshold; and
wherein the link optimization module responds to the threshold by communicating all outbound network packets of the application through a wired network interface and all inbound network packets of the application through the wireless network interface.

2. The information handling system of claim 1 wherein: the threshold varies based upon radio signal transmit strength of the wireless network interface.

3. The information handling system of claim 1 further comprising:
wherein the link optimization module applies plural factors to select from the plural network interfaces, the plural factors including at least the number of network packets sent by radio from the information handling system.

4. The information handling system of claim 3 wherein:
the link optimization module sends network packets from the application through plural network interfaces by translating the network packet Internet Protocol address at the network layer; and
the link optimization module selects the plural network interfaces in part based upon the number of wireless radio network packets sent by plural of the network interfaces.

5. The information handling system of claim 1 wherein the link optimization module monitors traffic of the plural network interfaces and adjusts application network packet distribution through the plural network interfaces to communicate wireless network packets through a wireless network interface having a number of packets of less than the threshold.

6. The information handling system of claim 1 wherein at least one of the plural network interfaces comprises a peer-to-peer network interface with a peer information handling system, the link optimization module assigning application network packets to the peer-to-peer network interface based upon the number of packets relative to the threshold.

7. The information handling system of claim 1 wherein at least one of the plural network interfaces comprises a mesh network interface with a mesh information handling system, the link optimization module assigning application network packets to the mesh network interface based at least in part upon the number of packets relative to the threshold.

8. A method for communication between a client information handling system and an external network, the method comprising:
establishing plural network interfaces between the client information handling system and external network, including at least a wired network interface and a wireless network interface;
executing an application on the client information handling system, the application generating information to communicate to the external network and receiving information from the external network;
communicating the application information as network packets through at least both the wired network interface and the wireless network interface;
tracking wireless transmissions sent by the plural network interfaces having wireless communication;
in response to the tracking reaching a threshold, adapting communication of the network packets to maintain the wireless transmissions below the threshold;
wherein the adapting communication includes at least communicating all outbound network packets of the application through the wired network interface and communicating all inbound network packets of the application through the wireless network interface.

9. The method of claim 8 wherein:
tracking wireless transmissions further comprises counting packets sent by the plural network interfaces that communicate wirelessly within a time window and comparing the counted packets to a threshold number of packets; and
adapting communication further comprises reducing transmit power of the wireless transmissions.

10. The method of claim 8 wherein:
- tracking wireless transmissions further comprises tracking transmit time of network packets sent by the plural network interfaces that communicate wirelessly within a time window and comparing the transmit time to a threshold transmit time; and
- adapting communication further comprises throttling the number of the network packets sent by the wireless transmissions.

11. The method of claim 10 wherein the wireless transmissions comprise wireless local area network transmissions.

12. The method of claim 8 wherein the wireless network interface comprises a mesh network interface.

13. The method of claim 8 wherein adapting communication of the network packets to maintain the wireless transmissions below the threshold further comprises modifying the wireless transmission Modulation Coding Scheme (MCS).

\* \* \* \* \*